United States Patent [19]

Rhoton et al.

[11] 3,891,833

[45] June 24, 1975

[54] VEHICLE COAST CONTROL SYSTEM

[75] Inventors: Richard S. Rhoton, Monroeville; Michael P. McDonald, Pittsburgh, both of Pa.

[73] Assignee: Westinghouse Electric Corporation, Pittsburgh, Pa.

[22] Filed: Apr. 5, 1974

[21] Appl. No.: 458,381

[52] U.S. Cl. ..... 235/150.2; 235/92 TC; 235/150.24; 246/182 C; 246/182 R; 246/187 B; 318/587
[51] Int. Cl. ...................... B60l 15/40; G06f 15/48
[58] Field of Search ......... 235/150.2, 150.24, 150.3, 235/151.32, 92 T, 92 TC; 188/110, 112, 181 R, 181 C; 246/182 A, 182 B, 182 C, 182 R, 187 B; 303/53; 318/364, 587, 601, 603; 340/22

[56] References Cited
UNITED STATES PATENTS

| | | | |
|---|---|---|---|
| 3,519,805 | 7/1970 | Thorne-Booth | 235/150.2 |
| 3,566,103 | 2/1971 | Wilcox et al. | 246/182 B |
| 3,604,905 | 9/1971 | Riondel | 235/150.24 |
| 3,639,754 | 2/1972 | Kovalcik et al. | 246/182 B |
| 3,655,962 | 4/1972 | Koch | 246/182 C |
| 3,799,057 | 3/1974 | Cassel | 246/282 B X |

FOREIGN PATENTS OR APPLICATIONS

| | | | |
|---|---|---|---|
| 1,513,625 | 7/1969 | Germany | 246/182 B |

*Primary Examiner*—Malcolm A. Morrison
*Assistant Examiner*—R. Stephen Dildlne, Jr.
*Attorney, Agent, or Firm*—R. G. Brodahl

[57] ABSTRACT

As a vehicle departs from a station, it senses at a reference position a wayside signal having a frequency indicative of the distance the vehicle should travel under tractive effort from the reference position to a coast position. A digital logic network on the vehicle includes an up/down counter which responds to the wayside signal for a predetermined time interval to count from a reference count level to a count level indicative of the distance the vehicle should travel under tractive effort prior to going into a coast mode of operation. A tachometer on the vehicle provides a speed signal having a frequency indicative of the speed at which the vehicle is traveling, with the number of pulses provided being a direct indication of how far the vehicle has traveled. The speed signal is used to count the up/down counter back down to the reference count level at which time tractive effort is interrupted on the vehicle, for allowing the vehicle to coast into the following station.

7 Claims, 18 Drawing Figures

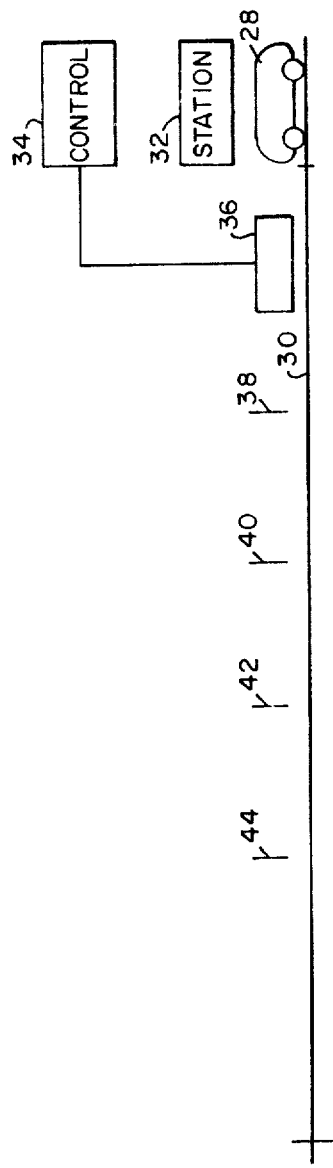
FIG. 3
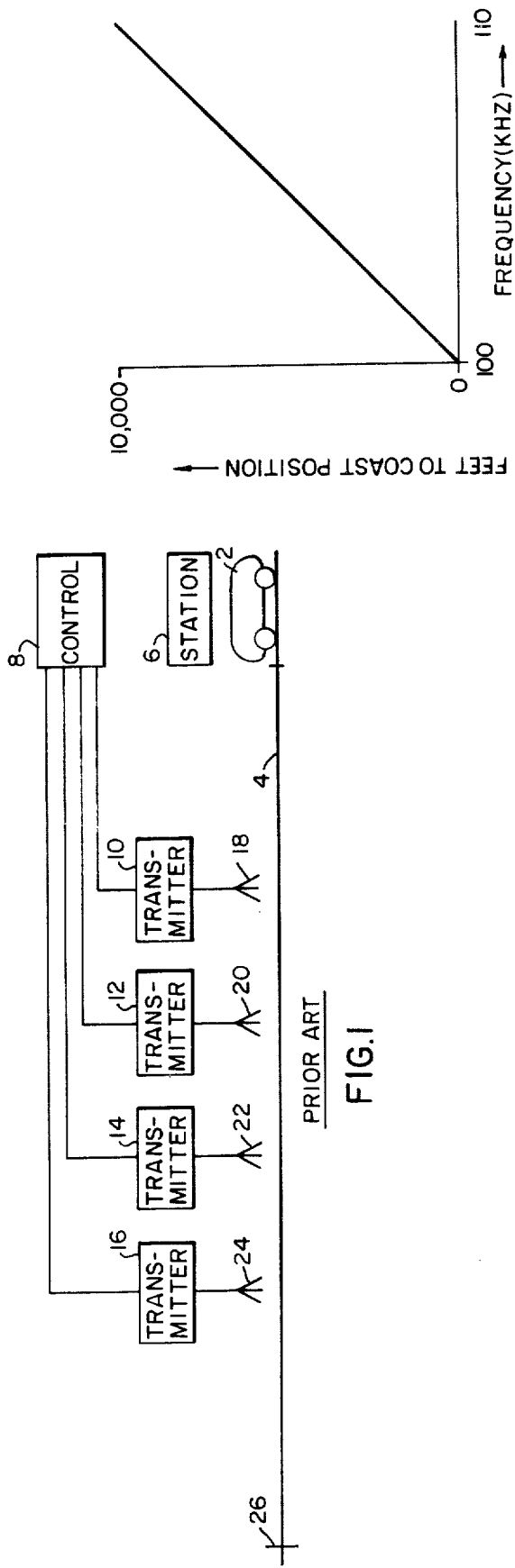
PRIOR ART
FIG. 1
FIG. 2

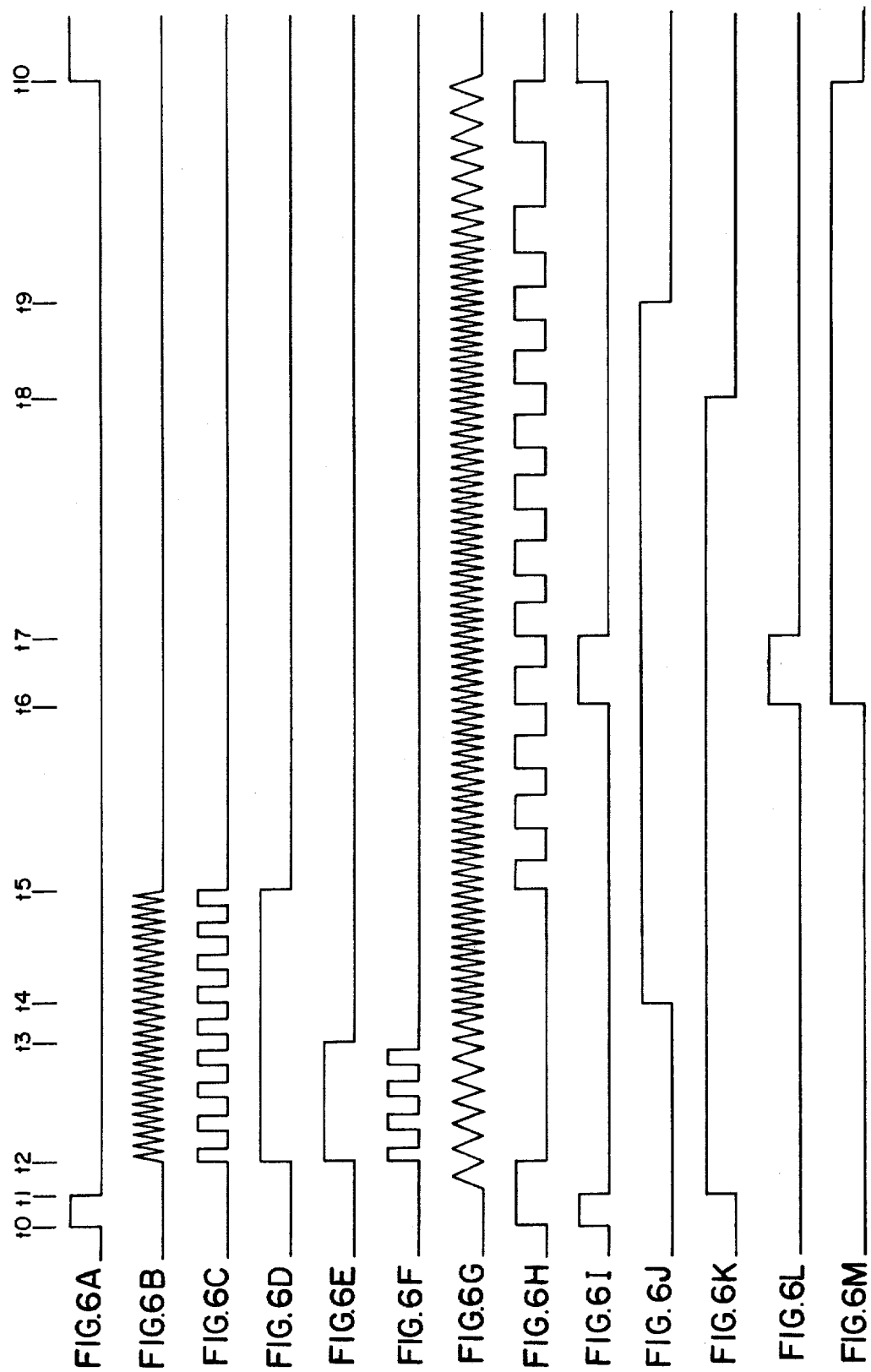

VEHICLE COAST CONTROL SYSTEM

BACKGROUND OF THE INVENTION

The travel of a vehicle from one station to the next should be accomplished in an efficient manner. There are two constraints which must be considered, namely the maintaining of a schedule, and the expenditure of a minimum amount of braking effort.

In systems where the maintenance of a schedule is of primary concern, the vehicle is generally run at reduced speeds, that is the performance of a given vehicle is modified in accordance with the schedule. This, however may not be conducive to the expenditure of a minimum amount of braking effort as the vehicle utilizes tractive effort for essentially the entire distance between stations.

In systems where the expenditure of a minimum amount of braking effort is a primary concern, the idea is to reduce wasted propulsion energy and minimize the heat generated by braking. This is generally accomplished by accelerating the vehicle to a maximum speed. The vehicle then travels for a fixed distance to a coast position at which tractive effort is interrupted, allowing the vehicle to coast into the station. This results in a minimum amount of heat being generated due to braking, since less braking effort is required due to the coasting. Known coast systems have a fixed number of beacons situated at predetermined positions along the track for defining respective coast positions. When a given beacon is energized, the vehicle senses a signal manifestation when passing the given beacon and in response thereto tractive effort is interrupted, and the vehicle begins to coast. Such known systems are expensive to install and maintain, as well as being inflexible due to the coast positions being fixed.

According to the present invention, a relatively inexpensive and easy to install coast control system is disclosed. The disclosed system also is flexible since the coast positions are variable in accordance with a variable frequency wayside signal, the frequency of which is indicative of how far the vehicle travels under tractive effort to the coast position. The wayside signal is transmitted from a single antenna situated at a position adjacent the station which the vehicle is leaving. Control logic apparatus on the vehicle responds to the sensed wayside signal for determining how far the vehicle travels under tractive effort prior to beginning to coast.

SUMMARY OF THE INVENTION

According to the present invention, a vehicle coast control system is disclosed which has means for providing a first signal coded to indicate the distance the vehicle should travel under tractive effort from a reference position to a coast position at which tractive effort is interrupted. There are means for providing a second signal indicative of how far the vehicle has traveled at a given instant of time. Also included are means for comparing the distances represented by the first and second signals on a time dependent basis, and lastly there are means for interrupting tractive effort on the vehicle for causing the vehicle to coast at the time the means for comparing senses that the distances represented by said first and second signals are equal.

BRIEF DESCRIPTION OF THE DRAWINGS

FIG. 1 is a schematic diagram representation of a known vehicle coast control system;

FIG. 2 is a schematic diagram representation of a vehicle coast control system according to the present invention;

FIG. 3 is a frequency and distance graph for the vehicle coast control system according to the present invention;

FIGS. 6A through 6M are wave-shape diagrams of certain signals present in the circuit illustrated in FIG. 5.

DESCRIPTION OF THE PREFERRED EMBODIMENT

Figure 4:
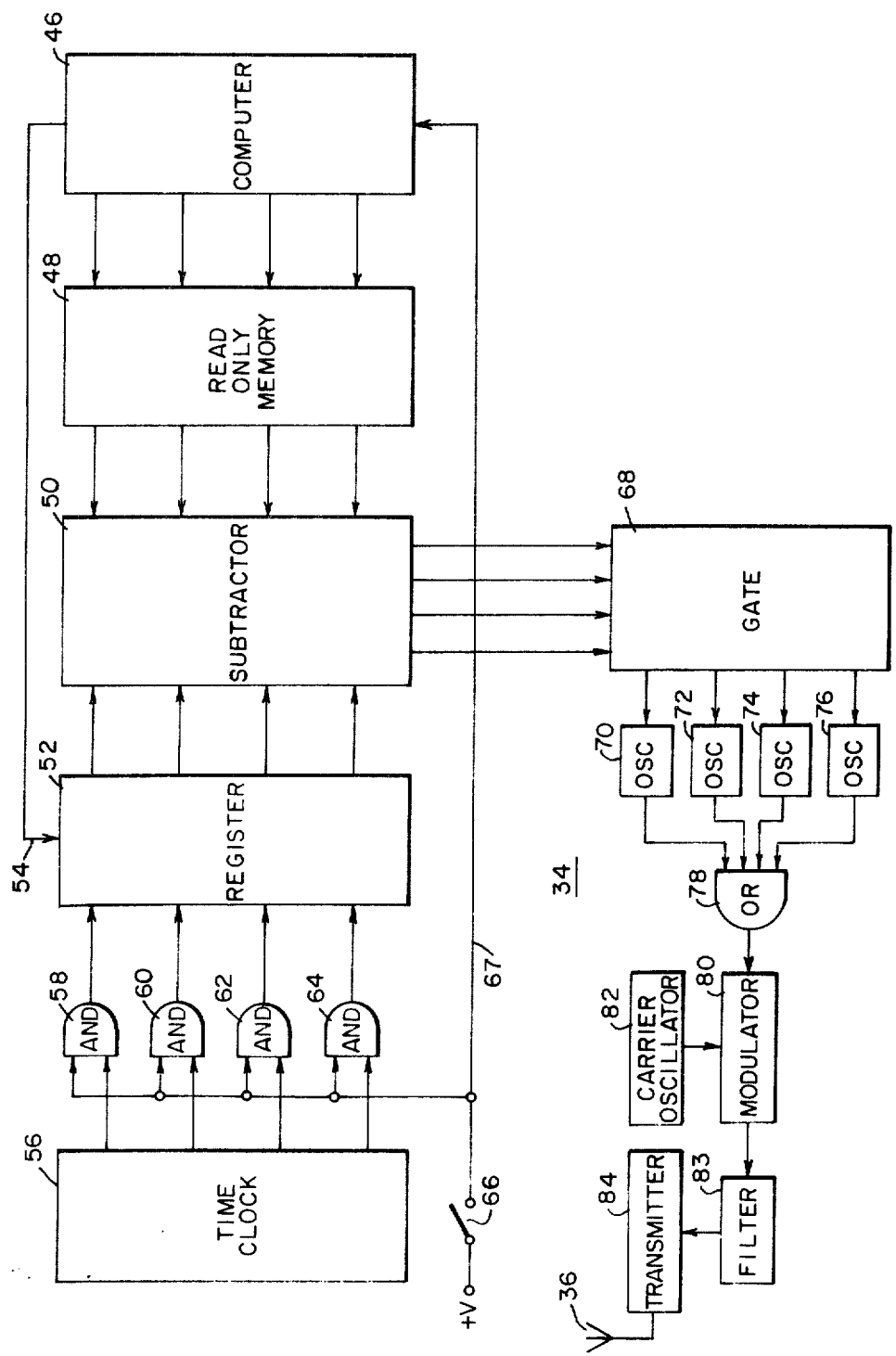
FIG. 4 is a block diagram representation of the wayside logic circuit for deriving the variable frequency coast control signal, which has a frequency indicative of how far the vehicle should travel under tractive effort before converting to a coast mode of operation.

Refer now to FIG. 1 which illustrates a vehicle coast control system known in the prior art. A vehicle 2 travels along a vehicle travel path 4 which may comprise steel rails for a steel wheel vehicle system, or a concrete type track if a rubber tired vehicle system is used. It is to be appreciated that the teachings of the present invention are also applicable to magnetic suspension, air cushion or other like vehicle control systems. The vehicle 2 is illustrated adjacent a station 6 and its movement is controlled in part by a control unit 8 which energizes a selected one of a plurality of transmitter units 10, 12, 14 and 16 which provide signal outputs at beacon antennas 18, 20, 22 and 24 respectively, when energized. When a signal is provided at a given beacon antenna, the signal is sensed by the vehicle as it passes the energized beacon and upon sensing the signal the vehicle then interrupts tractive effort and coasts to a second station area such as indicated by the line 26. It is seen that the vehicle receives a coast command signal only at a selected one of four fixed points along the vehicle travel path. The system therefore lacks flexibility in that to vary the coast control positions requires the physical movement of the beacon antennas from one position to another. Such movement of the beacon antennas is not only time consuming but costly. Another disadvantage of such a fixed beacon position system is that the cost of cables which are run from the control unit 8 to the respective transmitters are relatively expensive and are difficult to install.

FIG. 2 illustrates a vehicle coast control system according to the present invention. A vehicle 28 is illustrated on a vehicle travel path 30, and is situated adjacent a station 32. When the vehicle 28 leaves the station 32 under tractive effort, the control unit 34 provides a coast command signal to an antenna 36 which is situated at a reference position adjacent the travel path 30. In practice the antenna 36 may be on the order of 50 feet or so in length, and is laid adjacent the running surface 30, such that the vehicle 28 senses the signal transmitted by the antenna 36 as the vehicle passes. The signal radiated by the antenna 36 has a frequency which is indicative of how far the vehicle should travel prior to interrupting tractive effort, and thereby going into a coast mode of operation. That is for a first frequency the vehicle would travel to a position 38 prior to going into a coast mode of operation, for a second frequency would travel to a position 40 before going into a coast mode of operation, for a third frequency would travel to a position 42 prior to going into a coast mode of operation, and for a fourth frequency would travel to a position 44 prior to going into a coast mode of operation, and so on. Control logic apparatus on the vehicle responds to the different frequencies to determine the time, that is the distance, the vehicle travels before going into the coast mode of operation. It is seen that the coast control system illustrated in FIG. 2 is relatively less expensive due to there being only one antenna situated adjacent the running surface, and that the system is flexible in that there are a plurality of coast control positions available which vary from one position to another in accordance with the frequency of the coast control command transmitted.

FIG. 3 is a graphical representation of how the frequency is determined in relation to the distance of the coast position from the reference position, namely the antenna 36. With reference to the frequency ordinant of the graph it is seen that the output frequency transmitted may vary from 100 to 110 kilohertz (kHz) for distance of travel to a coast position from 0 to 10,000 feet as shown on the other ordinant of the graph. It follows that for 1 kilohertz change in frequency there is 1,000 feet change in the distance to the coast position. It is to be appreciated that any other number of frequency versus distance relationships may be used in the practice of the invention, and are merely a design choice.

Refer now to FIG. 4 which illustrates the wayside control logic apparatus 34 which may be used for providing the variable frequency coast control command signal to the antenna 36. A computer 46 stores a binary indication in a read only memory 48 of the scheduled departure time of the vehicle 28 from the station 32. The output of the read only memory is connected to a subtractor 50 which compares the scheduled departure time stored in the read only memory 48 with the actual departure time of the vehicle 32 which is stored in a register 52. The register 52 is cleared by a clear pulse from the computer 46 via a line 54 at a predetermined time after the vehicle has left the station 32. A time of day clock 56 provides binary indications to a plurality of AND gates 58, 60, 62, and 64 which are indicative of the time of day. These respective gates are enabled when a switch 66 is closed providing a +V enable signal to the respective gates. The switch may be closed in response to the doors closing on the vehicle, a control signal provided by the computer 46, a tredle closing when the vehicle leaves the station, or the like. This enable signal is also coupled to the computer 46 via the line 67. In any event, the switch closure is indicative of the time the vehicle 28 leaves the station 32. The outputs of the latter gates are provided as inputs to the register 52 indicating the time the vehicle has left the station, and as previously explained the output of the register 52 is connected to the subtractor 50 for comparing the actual time of departure of the vehicle with the scheduled time of departure of the vehicle as provided at the output of the read only memory 48. The difference signal appearing at the outputs of the subtractor 50 are provided as a plurality of inputs to a gate network 68 which responds to the time difference signal, for selectively energizing one of a plurality of oscillators 70, 72, 74, and 76. The outputs of the respective oscillators are connected to the inputs of an OR gate 78 which provides at the output thereof a signal having a frequency indicative of the distance the vehicle should travel prior to going into a coast mode of operation.

It is to be appreciated that one of the output lines from the subtractor 50 to the gate network 58 is a sign bit. When the sign bit is of one binary value this indicates that the vehicle left the station on schedule or ahead of schedule such that the vehicle is able to coast into the following station and still remain on schedule. On the other hand, if the sign bit were of the other binary value, this would be indicative that the vehicle is leaving the station at a time later than its scheduled departure time and therefore the vehicle should not go into a coast mode of operation, and therefore the output of the gate network 68 would be such that none of the oscillators 70–76 would be energized for providing an output signal.

The output of the OR gate 78 is connected to one input of a modulator network 80 which has another input thereof connected to the output of a carrier oscillator 82. For a system having a frequency characteristic as illustrated in FIG. 3, the carrier oscillator 82 therefore would have a frequency output of 100 kHz and the outputs from the OR gate 78 would be in the frequency range of 0 to 10 kHz, such that the output of the modulator 80 would vary in frequency from 100 to 110 kHz. It is to be appreciated that a single variable frequency oscillator could be used in place of the plurality of oscillators 70–76. The output from the modulator 80 is passed by a high pass filter 83, to the input of a transmitter 84 which energizes the antenna 36. As was previously explained, as the vehicle 28 passes the antenna 36 it receives the variable frequency signal which is indicative of how far the vehicle should travel before going into the coast mode of operation. Digital control logic apparatus on the vehicle responds to this variable frequency signal for determining the actual time the vehicle travels, that is the distance traveled, before going into the coast mode of operation. It is to be appreciated that any number of other modulation and/or coding schemes may be used in the practice of the invention to transfer the information from the wayside to the vehicle. For example, the wayside information signal may be a binary or a binary coded decimal indication of the distance to the coast position.

Figure 5:
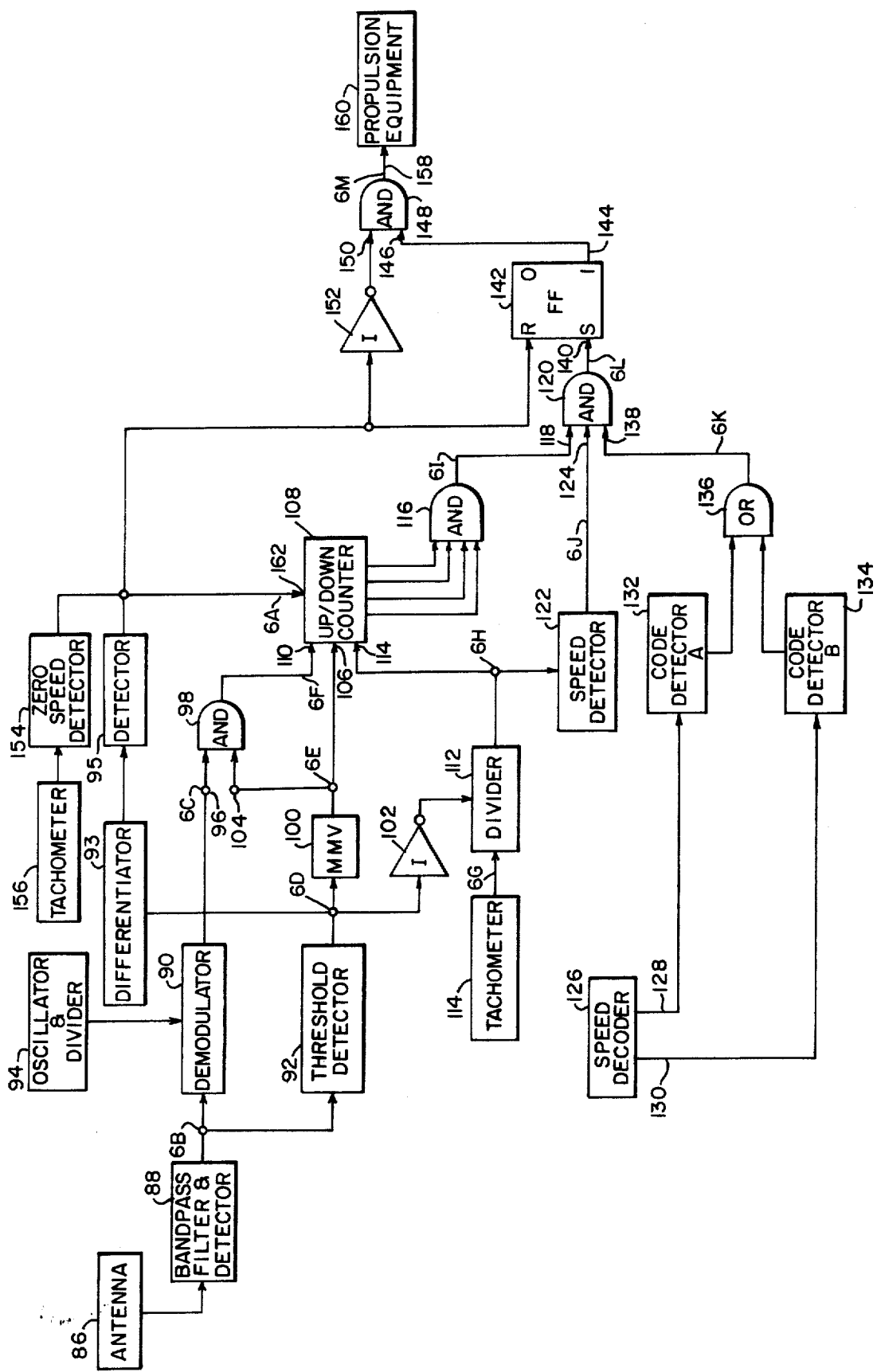
FIG. 5 is a block diagram representation of the vehicle carried coast control logic network which is used to provide a signal output when tractive effort is to be interrupted on the vehicle.

FIG. 5 illustrates the digital control logic apparatus which is carried on the vehicle 28 for responding to the variable frequency signal from the antenna 36 for determining when the vehicle goes into the coast control mode of operation. The letters 6A through 6M found on FIG. 5 are the circuit points at which the waveshapes illustrated in FIGS. 6A through 6M respectively are manifested in the circuit of FIG. 5. An antenna 86 senses the signal radiated by the antenna 36 as the vehicle passes same. The sensed signal is passed by a bandpass filter and detector 88 and provided to the respective inputs of a demodulator 90 and a threshold detector 92 (FIG. 6B). A second input to the demodulator 90 is from an oscillator and divider 94 which provides an output signal of 100 kHz, therefore the output signal from the demodulator 90 (FIG. 6C) is a signal which is the difference between the frequency 100 kHz from the oscillator and divider 94 and the signal sensed by the antenna 86, that is the output signal from the demodulator 90 would be a signal of a square-wave nature having a frequency from 0 to 10 kHz. This signal is provided to a first input 96 of an AND gate 98. The output of the threshold detector 92 (FIG. 6D) is a square-wave having a duration equal in time to the signal sensed by the antenna 86. This signal is provided to a differentiator 93, and to a detector 95 which passes a positive pulse to the reset terminal 162 of an up/down counter 108 to reset same to a reference count level. The signal output from the detector 92 is also provided to the input of a timing network such as a monostable multivibrator 100 and an inverter 102. In practice the time duration of the output signal from the monostable multivibrator 100 is on the order of 1 second. This signal (FIG. 6E) is provided to the second input terminal 104 of the AND gate 98 for enabling this gate for the 1 second time period and is also provided to an input terminal 106 of the up/down counter 108 for permitting the up/down counter to count up from the reference count level for the 1 second time interval in response to the pulses provided to a count up input terminal 110 from the output of the AND gate 98 (FIG. 6F). The counter 108 counts up in response to four input pulses (FIG. 6F). It is to be appreciated that in practice many more pulses are counted, and only four are shown for ease of illustration. It is seen therefore that the counter 108 counts up for a period of 1 second in response to the pulse outputs from the AND gate 98, and the count up from a reference position which may be zero to a final count position which is indicative of the distance the vehicle should travel prior to going into the coast mode of operation.

The output from the inverter 102 is a negative pulse which disables a divider network 112 during the time that the antenna 86 senses the wayside signal. During the time interval following the sensing of the wayside signal the output from the inverter 102 goes positive enabling the divider 112 to respond to the output pulses from a tachometer 114 which provides an output signal having a frequency indicative of the speed of travel of the vehicle. The number of pulses produced by the tachometer 114 is a direct measurement of the distance the vehicle has traveled. The division ratio of the divider 112 is chosen to provide a one pulse output from the divider 112 for a sensed distance of travel proportional to the distance of travel represented by a one pulse output from the AND gate 98. The output pulses from the divider 112 (FIG. 6E) are provided to a countdown input terminal 114 of the counter 108 causing the counter to countdown from the final count level to the reference count level which is indicative of the vehicle having reached the coast position. For the example shown (FIG. 6E), the counter counts down in response to four pulses from the divider 112. An AND gate 116 is connected to the outputs of the respective stages of the counter 108 for sensing when the counter has reached the reference count level, and in response thereto a change in signal level (FIG. 6I) is provided to an input 118 of an AND gate 120 as an indication that the vehicle has traveled the required distance prior to going into the coast mode of operation.

A speed detector 122 is connected to the output of the divider 112 for sensing the actual speed of travel of the vehicle. It is desirable to know the actual speed of travel of the vehicle prior to initiating the coast mode of operation to insure that the vehicle is traveling above a minimum speed level such that the vehicle is able to reach the station at the scheduled time of arrival when in the coast mode of operation. If the vehicle is traveling below this minimum speed, it follows that the vehicle should not be allowed to go into the coast mode of operation since the vehicle would arrive late at the station. For example, the speed detector 122 may be designed such that it provides an output signal only when the sensed speed of travel is above 30 miles an hour. The output signal from the detector 122 (FIG. 6J) is applied to a second input terminal 124 of the gate 124 as an enable signal.

Another constraint which may be provided is that the vehicle in fact is receiving a speed code above a given speed such that it would reach the station at a proper time interval. A speed decoder 126 provides outputs on lines 128 and 130 which are indicative of the commanded speed of travel. A code detector 132 is designed to detect a speed code for a curved portion of track, and a speed code detector 134 is designed to detect a speed code for a straight section of track which is a higher speed code than the code for the curved section of track. As long as the detector 132 or 134 detects the speed code for which it is designed an OR gate 136 provides an output signal (FIG. 6K) to an input terminal 138 of the AND gate 120 which is indicative of the vehicle being commanded to travel at a selected rate of speed. The AND gate 120 then having positive pulse indications at all input terminals provides an output signal (FIG. 6L) to a set terminal 140 of a set reset flip-flop 142. In response to the flip-flop 142 receiving the set pulse a positive pulse is provided at its one output terminal 144 to an input terminal 146 of an AND gate 148. The input to the second input terminal 150 of the AND gate 148 is by way of an inverter 152 which provides a positive output as long as a zero speed detector 154 doesn't sense a zero speed indication from a tachometer 156. The gate 148, therefore, provides a signal (FIG. 6M) via a line 158 to propulsion equipment 160 which indicates to the propulsion equipment that the vehicle should now go into a coast control mode of operation.

Once the vehicle goes into a coast control mode of operation, the speed detector 122 provides no output signal once the vehicle drops below the predetermined speed level, causing the output of the gate 120 to go low. This has no effect on the circuit output however, since the set reset flip-flop 142 remains set until the zero speed detector provides a positive output pulse which resets the flip-flop 142 and disables the gate 148 from providing the coast control signal to the propulsion equipment 160. The zero speed signal from the detector 154, occurs when the vehicle stops in the station. At this time, the up/down counter is reset by the zero speed pulse output provided to the reset terminal 162. System operation then repeats itself as the vehicle leaves the station and travels to the following station.

It is to be appreciated that devices other than the up/down counter 108 may be used for comparing the signal which is indicative of how far the vehicle is to travel, output of gate 98, with the output signal from the divider 112 which is indicative of how far the vehicle has traveled at a given instant of time. For example, a capacitor or other storage device could be charged to a reference voltage level in response to the output pulses of the gate 98. Another storage device such as a capacitor could be charged by the output of the divider 112, and the voltage levels of the two capacitors could be compared in a comparator network and when they reach like signal magnitudes the coast control signal could be provided. Alternatively, an integrator could respond to the output from the divider 112 and the output signal from the integrator could be compared with the charge storage device voltage which is charged on the output of the AND gate 98.

We claim:

1. In a vehicle coast control system, the combination comprising:

means for providing a first signal coded to indicate the distance said vehicle should travel under tractive effort from a reference position to a coast position at which tractive effort is interrupted;

means for providing a second signal indicative of how far said vehicle has traveled at a given instant of time;

means for comparing the distances represented by said first and second signals on a time dependent basis; and means for interrupting tractive effort on said vehicle for causing said vehicle to coast at the time said means for comparing senses that the distances represented by said first and second signals are equal.

2. In a vehicle coast control system, the combination comprising:

means for providing a first signal having a frequency indicative of the distance said vehicle should travel under tractive effort from a reference position to a coast position at which tractive effort is interrupted;

means for providing a second signal having a frequency indicative of the speed of travel of said vehicle;

counter means responsive to the provision of said first signal for counting from a reference count level to a final count level indicative of said distance, and for counting down from said final count level to said reference count level in response to the provision of said second signal; and means for interrupting tractive effort on said vehicle for causing said vehicle to coast in response to said counter means counting down to said reference count level.

3. In a vehicle coast control system, the combination comprising:

means for providing a first signal having a frequency indicative of the time interval required for said vehicle to travel under tractive effort from a reference position to a coast position;

means for providing a second signal having a frequency indicative of the speed of travel of said vehicle during said time interval;

counter means responsive to the provision of said first signal for counting from a reference count level to a final count level indicative of said time interval, and for counting down from said final count level to said reference count level in response to the provision of said second signal; and means for interrupting tractive effort on said vehicle for causing said vehicle to coast in response to said counter means counting down to said reference count level.

4. In a vehicle coast control system, the combination comprising:

means for providing for a limited time period a first signal having a frequency indicative of the time interval required for said vehicle to travel under tractive effort from a reference position to a coast position;

means for providing a second signal having a frequency indicative of the speed of travel of said vehicle during said time interval;

frequency divider means responsive to the provision of said second signal, during a time following said limited time period during which said first signal is provided, for providing a third signal having a frequency proportional to the speed of said vehicle;

an up/down counter which counts up from a reference count level to a final count level indicative of said time interval in response to the provision of said first signal, and for counting down from said final count level to said reference count level in response to the provision of said third signal; and means for inhibiting tractive effort on said vehicle for causing said vehicle to coast in response to said up/down counter counting down to said reference count level.

5. The combination claimed in claim 4, wherein said means for inhibiting tractive effort is operative only in response to detecting said vehicle is traveling at least at a given speed of travel.

6. The combination claimed in claim 5, including:

means for resetting said counter in response to detecting said vehicle has reached a defined zero speed of travel.

7. In a vehicle coast control system, the combination comprising:

means for providing a first signal in response to sensing when said vehicle leaves a reference position;

means for storing a second signal indicative of the time said vehicle is scheduled to leave said reference position;

means for comparing said first and second signals for providing a third signal having a frequency indicative of the time interval required for said vehicle to travel under tractive effort from said reference position to a coast position where tractive effort is inhibited on said vehicle;

an antenna situated adjacent said reference position, said antenna being excited by said third signal for providing a wayside signal having a frequency indicative of the time interval required for said vehicle to travel under tractive effort from said reference position to a coast position where tractive effort is inhibited on said vehicle;

signal receiving means on said vehicle for receiving said wayside signal during the time said vehicle passes said antenna;

means for providing a speed signal having a frequency indicative of the speed of travel of said vehicle;

an up/down counter which counts up from a reference count level to a final count level during the time said signal receiving means receives said wayside signal, and which counts down from said final count level to said reference count level in response to the provision of said speed signal;

a speed detector which provides an output signal in response to sensing said vehicle is traveling at least at a given rate of speed;

a speed decoder which decodes speed commands for said vehicle for providing decoded speed commands;

a code detector which provides an output signal in response to said speed decoder providing a selected speed command; and means for inhibiting tractive effort on said vehicle for causing said vehicle to coast in response to said up/down counter counting down to said reference count concurrent with said speed detector and said code detector providing output signals.

* * * * *